No. 646,303. Patented Mar. 27, 1900.
A. P. MORROW.
BACK PEDALING BRAKE.
(Application filed Mar. 30, 1899.)
(No Model.) 2 Sheets—Sheet 1.

Witnesses
Harry S. Rohrer
F. C. McCleary

Inventor
Alexander P. Morrow
by Jas. L. Skidmore
his Attorney

No. 646,303. Patented Mar. 27, 1900.
A. P. MORROW.
BACK PEDALING BRAKE.
(Application filed Mar. 30, 1899.)
(No Model.) 2 Sheets—Sheet 2.
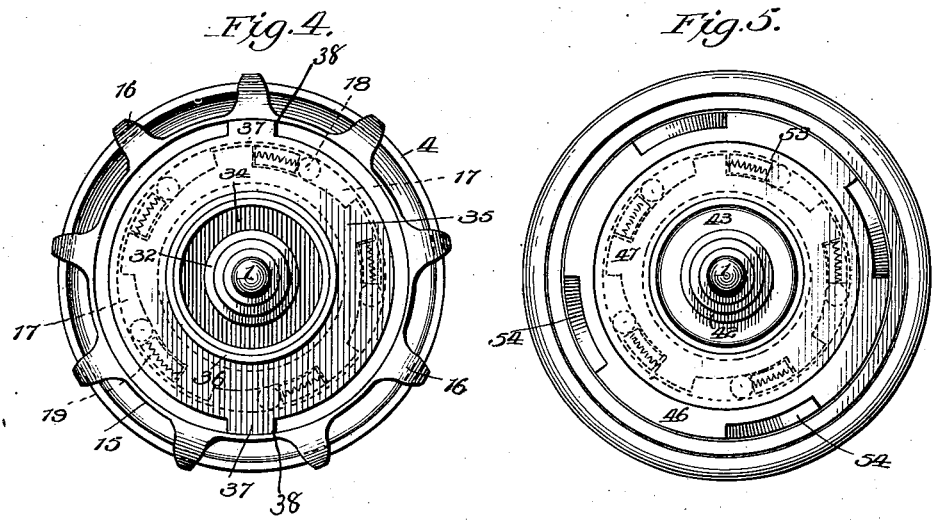
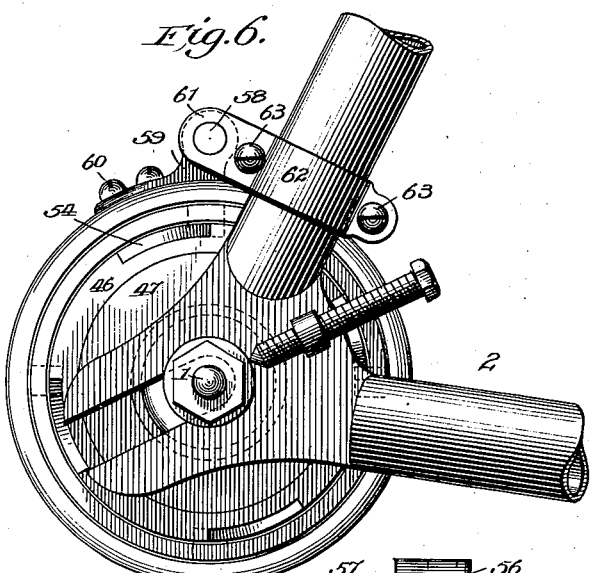
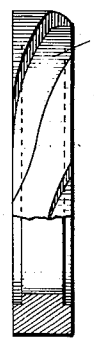
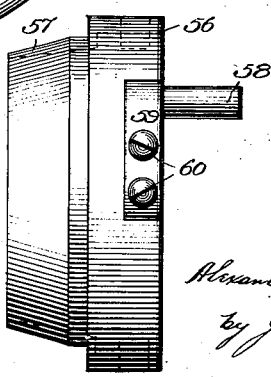
Witnesses
Harry S. Rohrer.
J. W. Cleary.
Inventor
Alexander P. Morrow
by Jas. L. Skidmore
his Attorney

UNITED STATES PATENT OFFICE.

ALEXANDER P. MORROW, OF ELMIRA, NEW YORK.

BACK-PEDALING BRAKE.

SPECIFICATION forming part of Letters Patent No. 646,303, dated March 27, 1900.

Application filed March 30, 1899. Serial No. 711,136. (No model.)

*To all whom it may concern:*

Be it known that I, ALEXANDER P. MORROW, a citizen of the United States, residing at Elmira, in the county of Chemung and State of New York, have invented certain new and useful Improvements in a Combined Brake and Coaster for Bicycles, &c.; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a combined brake and coasting device for bicycles and like vehicles, the primary object being to provide mechanism controlled entirely by the feet of the rider whereby the rear-wheel sprocket may be quickly disengaged from the hub to permit of coasting without removing the feet from the pedals and whereby back-pedaling will apply a brake to the rear-wheel hub.

A further object of the invention is to provide effective means for quickly adjusting the bearings of the coasting and brake mechanism.

The novel features of the invention and the details of their construction will be fully described hereinafter and defined in the appended claims.

Figure 1:
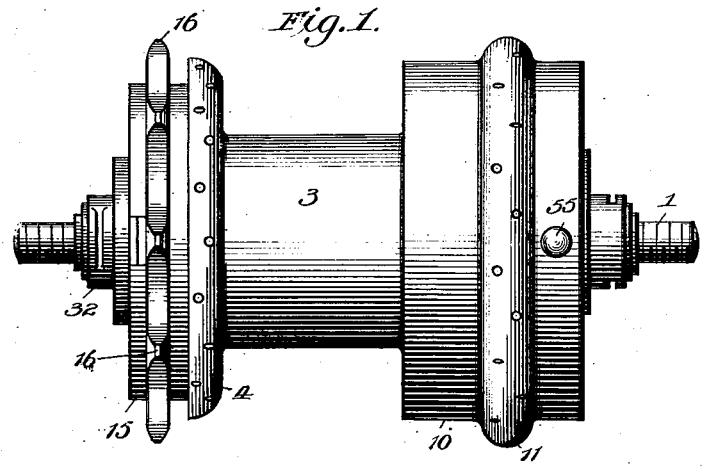
Figure 2:
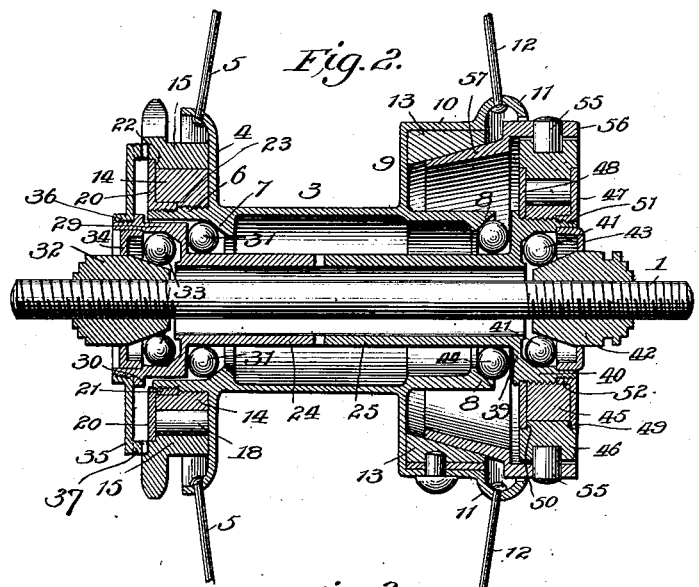
Figure 3:
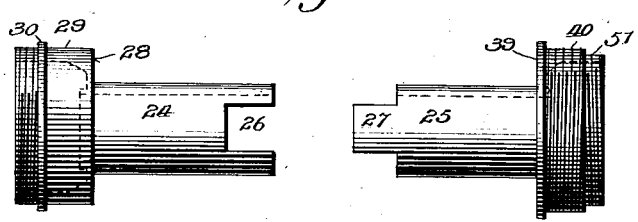

In the accompanying drawings, which constitute a part of this specification, Figure 1 is a side elevation of a hub and axle with my improvements applied thereto. Fig. 2 is a central longitudinal sectional view of the hub and mechanism coöperating therewith. Fig. 3 is an elevation of the sectional sleeve or auxiliary hub forming a part of the invention. Fig. 4 is a side elevation, with the outer coupling-plate removed, of the left-hand side of Fig. 1. Fig. 5 is a similar view of the right-hand side of Fig. 1. Fig. 6 is a side elevation illustrating the connections between the brake mechanism and the frame of the machine. Fig. 7 is a detail view showing a portion of one member of the brake-clutch, and Fig. 8 is a plan view of the non-revoluble brake-ring and its securing-lug.

The reference-numeral 1 designates the rear-wheel axle, threaded at its ends and adapted to be held stationary in suitable bearings in the frame 2.

3 designates the hub, provided at one end with an annular flange 4, to which the inner ends of the spokes 5 are secured, a threaded extension 6, and an internal annular beveled shoulder 7. The opposite end of the hub 3 is also provided with a beveled annular shoulder 8 and a housing comprising a vertical flange 9, a horizontal flange 10, and a laterally-projecting concavo-convex rim 11, to which the spokes 12 are secured. Within this annular chamber or housing is secured a friction-ring 13, of fibrous or equivalent material, the inner surface of which is slightly inclined or beveled, as shown in Fig. 2.

The driving-sprocket consists of a ring 14, internally threaded to fit upon the threaded extension 6 of the hub, and a rim 15, having sprocket-teeth 16 on its outer periphery and fitting over the ring 14. Between the parts 14 and 15, constituting the sprocket, are interposed clutch devices of any preferred form. I preferably provide the periphery of the ring 14 with equidistant recesses 17 of less depth at one end than at the other and arrange in each of said recesses a clutch-roller 18, behind which is located a spring-pressed block 19, the relation of the parts being such that when the sprocket is being driven forward by the driving-chain the parts 14 and 15 will be clutched together by the rollers to revolve in unison; but when the forward motion of the rim is arrested by a stoppage of the pedals the rollers 18 will drop back into the deeper ends of the recesses 17, causing the ring 14 to revolve within the rim without revolving the latter.

20 designates a ring provided with a horizontal flange 21, which is internally threaded to fit upon the hub extension 6. This ring 20 and its flange abut against shoulders 22 and 23 and serve to secure the sprocket in place. Within the hub 3 is located a sleeve or auxiliary hub comprising two independent sections 24 and 25, one of which, 24, is formed with diametrically-opposite slots 26, while the other, 25, is provided with lugs 27, entering the slots 26, and is capable of a limited lateral movement, as will be referred to more particularly hereinafter.

The outer end of the sleeve-section 24 is provided with a shoulder 28 and an annular internally-beveled flange 29, which latter is also provided with a shoulder 30. Between the shoulder 28 and the beveled shoulder 7 of the hub ball-bearings 31 are interposed, and between the internally-beveled flange 29 and a cone-bearing 32 on the adjacent end of the axle 1 ball-bearings 33 are interposed, a protecting-cap 34 being located upon the cone-bearing.

Beyond the shoulder 30 the outer end of the sleeve-section 24 is threaded to receive a coupling-ring 35, which bears against the shoulder 30 and is provided with a horizontal internally-threaded flange 36, which is screwed upon the threaded end of the section 24. This coupling-ring 35 is provided at diametrically-opposite points with lugs 37, which project into sockets 38 of the sprocket-rim and serve to connect the ring 35, the sprocket-rim, and the auxiliary hub together revolubly.

The outer end of the section 25 of the auxiliary hub or sleeve is provided with an annular shoulder 39, from which projects a horizontal flange 40, externally screw-threaded and beveled on its inner side to receive ball-bearings 41, which are held in position by a cone-bearing 42, provided with a cap or protecting-ring 43. Between the shoulder 39 and the adjacent beveled shoulder 8 of the hub ball-bearings 44 are interposed.

Upon the threaded flange 40 of the section 25 the clutch mechanism of the brake is arranged, comprising a revoluble ring 45, internally threaded to fit upon the flange, and an outer ring 46, supported upon the ring 45 by rings 47 and 48, which are internally threaded for attachment to the flange 40, but bear loosely against shoulders 49 and 50 of the ring 46 to revolve independently of said ring. The flange 40 is provided with an offset or shoulder 51 to facilitate the attachment of the ring 47, which latter is formed with a laterally-projecting flange 52.

Between the ring 45 and the inner surface of the ring 46 at equidistant points are arranged clutch devices 53, similar in construction to those employed between the parts 14 and 15 of the sprocket-wheel, but reversely arranged with relation to said sprocket-wheel clutches, so that whereas the sprocket-wheel clutches are normally in operation to cause the members of the wheel to revolve together the brake-clutches are normally free to permit the revoluble ring 45 to revolve independently of the ring 46. The outer periphery of the ring 46 is provided with a plurality of equidistant spiral grooves 54, into each of which projects a pin 55, said pins extending radially from the horizontal flange or rim 56 of a beveled brake-ring 57, the latter being only slightly inclined to fit within and coöperate with the fiber friction-ring 13, secured to the hub.

The brake-ring 57 is held against revolution by a lug or arm 58, having a stem or shank 59, secured to the flange 56 of the brake-ring by screws 60, said lug or arm 58 being seated within a socket 61, formed in one end of a bracket 62, securely clamped by screws 63 to the frame 2 of the machine, as shown in Fig. 6. While the lug or arm 58 prevents rotation of the brake-ring, it is loosely secured in its socket to permit the brake-ring to be shifted laterally.

The operation of the mechanism constructed as above described is as follows: As has been stated above, the sprocket members are held together by their clutches as long as the sprocket is driven in a forward direction, while the clutches of the brake are normally free to allow the ring 45 to revolve within the ring 46 as long as the sprocket is revolving in the forward direction. When the rider desires to coast, he stops the revolution of the pedals and by simply holding the pedals stationary he disengages the two members of the sprocket-wheel, the momentum of the machine causing the wheel-ring 14 to revolve while the sprocket-rim is held stationary. Thus the coasting is accomplished without the removal of the rider's feet from the pedals and without operating the brake. To apply the brake, the rider imparts back pressure to the pedals, which revolves the sprocket-rim rearwardly, carrying with it the coupling-ring 35 and auxiliary hub-sections 24 and 25. The backward movement of these sections 24 and 25 causes the clutches 53 to bind upon the ring 46, imparting a rearward rotary movement to said ring, which causes the brake-ring 57 and its flange 56 to move laterally toward the revolving friction-ring 13 through the medium of the pins 55, which are operated upon by the walls of the spiral grooves 54. The frictional contact of the ring 57 and the revolving friction-ring 13, carried by the hub, retards the revolution of the rear wheel, the degree of braking action depending upon the amount of pressure upon the pedals in the back-pedaling. The lug or arm 58 slides freely within its socket 61 to allow of the lateral movement of the brake-ring; but said lug being held by a fixed bracket of the frame effectually prevents the revolution of the brake-ring 57.

It will be apparent that as soon as the forward revolution of the sprocket-wheel is resumed the brake-clutches will be released and the sprocket-clutches will again clutch the sprocket-rim, with the result that the brake-ring 57 resumes its normal position out of contact with the friction-ring 13.

An important advantage of the construction here shown and described is that the simultaneous adjustment or tightening of all of the ball-bearings can be effected by simply turning either of the cone-bearings 32 or 42.

While the construction illustrated in the drawings is entirely practical in all of its details, I do not desire to limit the invention to all of the minor details shown, but reserve the right to make all such modifications in the construction as may properly fall within the scope of the following claims.

I claim as my invention—

1. The combination with the rear-wheel hub and axle of a cycle, of a coasting device comprising a sectional sprocket-wheel and clutches, a brake device and clutch mechanism therefor and a coupling between the brake mechanism and one of the sections of the sprocket-wheel, comprising a sectional sleeve, one member of which is secured to the rim of the sprocket-wheel, the other member being secured by one of the cone-bearings.

2. The combination with the rear-wheel hub and axle of a cycle, of a coasting device comprising a sectional sprocket-wheel and clutches, a brake device and clutch mechanism therefor, and a coupling between the sectional sprocket-wheel and the brake mechanism comprising a sectional sleeve within the hub and a ring secured upon said sleeve and connected to the rim of the sprocket to revolve therewith.

3. The combination with a hub provided with an annular housing at one end, of a friction-ring within said housing, a sleeve or auxiliary hub located within the main hub, a coasting device located upon one end of the main hub, the outer member of the coasting device being coupled to the adjacent end of the sleeve, brake mechanism located upon the opposite end of the sleeve and coöperating with the friction-ring on the hub.

4. The combination with a hub provided at one end with an annular chamber or housing, of a friction-ring secured within the housing, coasting mechanism located upon one end of the hub, a sleeve arranged within the hub and coupled to the outer member of the coasting mechanism, a brake-ring secured to the frame of the machine against rotation, but capable of a limited lateral movement, a peripherally-grooved ring within the brake-ring, pins projecting from the brake-ring into the grooves of the grooved ring, and clutch devices for imparting a rotary movement to the grooved ring when the hub and sleeve are turned in a backward direction.

5. The combination with a hub provided at one end with coasting mechanism, and at its opposite end with a friction-ring, of a two-part sleeve arranged within the hub, one of said parts being connected to the outer member of the coasting mechanism, a brake-ring coöperating with the other part of the sleeve, and means operated by back-pedaling for moving said brake-ring laterally.

6. The combination with the hub, and coasting device secured thereto, of a sectional sleeve located within the hub, brake mechanism arranged on one end of said sleeve, and a coupling-ring secured upon the opposite end of the sleeve, and secured to the outer member of the coasting device to revolve therewith, said brake mechanism coöperating with the coasting devices, and adapted to be operated by back-pedaling.

7. The combination with a hub provided at one end with a coasting device, and at its opposite end with a friction-ring, of a sleeve arranged within the hub and coupled at one end to the outer member of the coasting device, a brake-ring supported upon the opposite end of the sleeve, and having a non-rotatable but laterally-movable friction-ring coacting with the friction-ring on the hub, and means for applying and releasing the brake, comprising a ring fixed to the sleeve to revolve therewith, a peripherally-grooved ring fitting over the fixed ring, clutches between said rings and pins projecting from the inner surface of the brake-ring into the grooves of the grooved ring.

8. The combination with the machine-frame, of a bracket secured thereto and provided with a socket or opening, a brake-ring provided with a lug or arm fitting loosely within said socket or opening, a hub provided at one end with coasting mechanism and at its opposite end with a friction-ring coöperating with the brake-ring, a sleeve within said hub, clutch mechanism for operating the brake, and means for moving the brake-ring laterally.

9. The combination with a hub provided at one end with a beveled friction-ring, and at its opposite end with coasting mechanism, of a sectional sleeve within the hub provided with a threaded extension, concentric clutch-rings carried by said threaded extension, a non-rotatable but laterally-movable brake-ring and means for causing the brake-ring to move laterally and engage the beveled friction-ring on the hub, and ball-bearings between the sectional sleeve and axle and between the sectional sleeve and hub.

10. The combination with the axle, of a hub provided at one end with an annular internal shoulder and coasting mechanism, and at its opposite end with a beveled shoulder and a friction-ring, a sectional sleeve within the hub provided at one end with a shoulder and flange, and at its opposite end with a shoulder and flange and a threaded extension, a non-rotatable but laterally-adjustable brake-ring coöperating with the friction-ring of the hub, ball-bearings between the sleeve and hub, adjustable cone-bearings on the axle, ball-bearings between said cone-bearings and the flanges of the sleeve, clutch mechanism for forward driving, and independent clutch mechanism for operating the brake-ring.

In testimony whereof I affix my signature in presence of two witnesses.

ALEXANDER P. MORROW.

Witnesses:
 OLIVER P. HIPPLE,
 M. L. BANKS.